(12) United States Patent
Chiueh (10) Patent No.: US 7,245,917 B2
(45) Date of Patent: Jul. 17, 2007

(54) SYSTEM AND METHOD FOR IP HANDOFF

(75) Inventor: Tzi-cker Chiueh, East Setauket, NY (US)

(73) Assignee: Research Foundation of the State University of New York, Stony Brook, NY (US)

( * ) Notice: Subject to any disclaimer, the term of this patent is extended or adjusted under 35 U.S.C. 154(b) by 716 days.

(21) Appl. No.: 10/815,443

(22) Filed: Apr. 1, 2004

(65) Prior Publication Data

US 2005/0053034 A1    Mar. 10, 2005

Related U.S. Application Data

(60) Provisional application No. 60/501,114, filed on Sep. 8, 2003.

(51) Int. Cl.
*H04Q 7/20* (2006.01)
(52) U.S. Cl. ............... 455/442; 455/436; 455/445; 370/352; 370/432
(58) Field of Classification Search ............ 455/435.1, 455/435.2, 436, 437, 438, 439, 442–443, 455/445; 370/352, 432

See application file for complete search history.

(56) References Cited

U.S. PATENT DOCUMENTS 6,721,297 B2 *   4/2004   Korus et al. ................ 370/338
7,023,828 B2 *   4/2006   Korus et al. ................ 370/338

* cited by examiner

*Primary Examiner*—Tony T. Nguyen
(74) *Attorney, Agent, or Firm*—F. Chau & Associates, LLC (57) ABSTRACT

A seamless vertical handoff method allows the network applications and connections on a mobile node to continue without disruption as it moves within a wireless overlay network that comprises multiple possibly overlapping layers of wireless networks (e.g., a WLAN and a WWAN) with different underlying technologies, providing mobile roaming capabilities. The method comprises a WLAN access point signal strength monitor for determining when to switch between WLAN and WWAN, and a network connection migration scheme that can move an active network connection from a wireless link of one technology to another wireless link of a different technology in a way that is transparent to the user, the remote end of the network connection, and the operator of the WWAN carrier.

25 Claims, 8 Drawing Sheets

SYSTEM AND METHOD FOR IP HANDOFF

This application claims the benefit of U.S. Provisional Application No. 60/501,114, filed Sep. 8, 2003.

BACKGROUND OF THE INVENTION

1. Field of the Invention

The present disclosure relates to wireless roaming, and more particularly to a system and method for vertical handoff in a wireless network.

2. Discussion of Related Art

Wireless connectivity is a burgeoning market in which consumers are coming to expect network access in a variety of venues, such as malls, hotels, public spaces, etc. Wireless Local Area Networks (WLAN) are providing the connectivity.

Within these venues dead zones are a problem. Dead zones are pockets within a WLAN having reduced or no wireless signal for connecting to the network. As a mobile node moves into a dead zone, any connection to the network will be substantially degraded or dropped. The dead zones detract from the users experience of wireless connectivity.

One method of limiting dead zones is to implement a network comprising different wireless technologies having different capabilities in a given geographic area. For a wireless device to move within such a network, a handoff is needed between wireless network cells to provide continuous connections to the network.

Handoffs in wireless mobile networks can be characterized into two categories, horizontal handoff and vertical handoff. Horizontal handoff allows mobile nodes to move among wireless network cells that support the same wireless link technology. Vertical handoff allows device movement within a network environment that comprises heterogeneous wireless links.

Because vertical handoff involves different types of connections, e.g., 802.11 and General Packet Radio Service (GPRS), handing a connection from one cell to another is slow as compared to horizontal handoff, and detracts from a user's wireless experience. For example, until the new connection is established, the mobile node is cut off from the network. Further, packet loss or delay during a handoff interval can incorrectly trigger a congestion control mechanism at the sender side of any Transmission Control Protocol (TCP) connections in which the mobile node is involved, thus greatly slowing down the throughput.

No known system or method exists for seamless vertical handoff between different wireless technologies. Therefore, a need exists for a system and method for performing a seamless vertical handoff.

SUMMARY OF THE INVENTION

According to an embodiment of the present disclosure, a vertical handoff system comprises a first foreign agent providing connectivity to a network, the first foreign agent broadcasting a wireless local area network signal, and a second foreign agent providing connectivity to the network via a wireless wide area network signal. The system further comprises a mobile node comprising executable code for seamlessly performing a vertical handoff between the first foreign agent and the second foreign agent, and a home agent routing information to the mobile node through one of the first foreign agent and the second foreign agent according to an established connection of the mobile node.

The mobile node further comprises a signal strength monitor. The mobile node comprises a buffer for caching information received through the first foreign agent prior to establishing a connection with the second foreign agent.

The second foreign agent comprises a buffer for caching information to be transmitted to the mobile node.

The home agent comprises a router for routing information transmitted from the mobile node.

The executable code for performing the vertical handoff includes a link status monitor for monitoring a signal strength of the wireless local area network signal. The link status monitor further includes a communication daemon for initiating the vertical handoff upon determining the signal strength to be undesirable and for establishing connectivity between a mobile internet protocol module of the mobile node and the second foreign agent.

The wireless local area network connects wirelessly to the mobile node via radio frequency electromagnetic airwaves.

The wireless wide area network connects wirelessly to the mobile node via one of Code Division Multiple Access, Global System for Mobile Communications, General Packet Radio Service, Enhanced Data rate for Global Evolution, or Wideband Code Division Multiple Access.

According to an embodiment of the present disclosure, a seamless vertical handoff method comprises establishing a network connection to a network host via a wireless local area network, determining a strength of the wireless local area network connection to be at or below a threshold strength, and moving, seamlessly, the network connection to a wireless wide area network.

The transition is transparent to a user and a remote end of the network connection.

The moving comprises buffering packets at a home agent and pacing packets sent to a mobile node, wherein the network connection exists between the home agent and the mobile node.

According to an embodiment of the present disclosure, a method for vertical handoff in a wireless network vertical comprises monitoring a wireless local area network signal carrying an active network connection, initiating vertical handoff to a wireless wide area network signal upon determining that the wireless local area network signal is undesirable, tunneling the active network connection over the wireless wide area network signal, and caching and replaying information over the wireless wide area network signal.

Initiating the vertical handoff comprises establishing a wireless wide area network connection to a mobile node. Initiating the vertical handoff comprises caching information received by a mobile node over the wireless local area network signal. The caching of information received over the wireless local area network is performed before a wireless wide area network connection is established.

The method further comprises determining whether a second wireless local area network signal is desirable prior to initiating the vertical handoff. The method comprises initiating a horizontal handoff upon determining that the second wireless local area network signal is desirable.

The method comprises initiating vertical handoff from the wireless wide area network signal to the wireless local area network signal upon determining that the wireless local area network signal is desirable.

Desirability corresponds to a threshold for measuring strength of a wireless signal.

Tunneling includes redirecting a signal of a client side mobile internet protocol implementation from the wireless local area network signal to the wireless wide area network signal.

Tunneling includes providing a communication agent using a protocol to talk to home agent and mobile node.

Tunneling includes providing a mobile internet protocol foreign agent for communicating with a mobile node and a home agent, establishing a forwarding tunnel between the home agent and the mobile node, authenticating the mobile node, and updating a routing table to route packets.

Tunneling includes tunneling packets from a home agent directly to a mobile node.

Tunneling includes intercepting traffic going to a mobile node belonging to an enterprise, and establishing a tunnel between the mobile node and a network address translation gateway, wherein communications between a mobile node and a communicating party is via the network address translation gateway.

According to an embodiment of the present disclosure, a program storage device is provided, readable by machine, tangibly embodying a program of instructions executable by the machine to perform method steps for vertical handoff in a wireless network. The method steps comprising monitoring a wireless local area network signal carrying an active network connection, initiating vertical handoff to a wireless wide area network signal upon determining that the wireless local area network signal is undesirable, tunneling the active network connection over the wireless wide area network signal, and caching and replaying information over the wireless wide area network signal.

BRIEF DESCRIPTION OF THE FIGURES

Preferred embodiments of the present invention will be described below in more detail, with reference to the accompanying drawings.

DETAILED DESCRIPTION OF PREFERRED EMBODIMENTS

To support seamless vertical handoff between a wireless wide area network (WWAN), such as GPRS, and a wireless local area network (WLAN), a WLAN link status is monitored to determine whether to use WLAN technology or a WWAN link. A Mobile IP (internet protocol) implementation is provided for establishing connectivity to the WLAN link, and packet scheduling and buffering mechanisms are supported to accommodate transmission characteristics of the WWAN link. Link monitoring may be carried out by an external software module, which in turn triggers network-layer handoff supported by Mobile IP when a vertical handoff is needed. The Mobile IP implementation may be used whether or not a foreign agent for WWAN link and a mobile node are on the same subnet.

According to an embodiment of the present disclosure a heterogeneous wireless network comprises two foreign agents using different, possibly overlapping, wireless transmission technologies. A first foreign agent is based on a WLAN. In a WLAN there are no physical connection wires needed between the mode node and the infrastructure. The signals are sent using radio frequency electromagnetic airwaves. The Institute of Electrical and Electronics Engineers (IEEE) 802.11a, b, and g are WLAN standards and may be referred to as Wi-Fi.

A second foreign agent provides connectivity via a WWAN, for example, Code Division Multiple Access (CDMA), Global System for Mobile Communications (GSM), GPRS, Enhanced Data rate for Global (or GSM) Evolution (EDGE) and Wideband-CDMA.

An example of a heterogeneous wireless network is a wireless overlay network, in which different wireless technologies co-exist in the same geographical area, for example, infrared/Bluetooth for personal area networking, 802.11 based WLAN for local area networking, and cellular communication networks for wide area networking. A wireless overlay network permits a user to choose to use the most appropriate wireless link technology to satisfy a need. Throughout the disclosure the term connection includes wired and/or wireless communications links unless otherwise specified.

Each foreign agent is connected to a home agent across an IP network, such as the Internet. A mobile node, such as a laptop computer, is capable of connecting to the first foreign agent and/or the second foreign agent. Further, the mobile node comprises functionality for monitoring the signal strength of packets from the foreign agent on the WLAN, and upon determining a weakening signal, seamlessly moving the user's on-going network connections to another foreign agent that has a more desirable signal, without disrupting the continuity of these connections. Signal strength can be measured in decibels compared to one milliwatt (or dBm). Various known techniques exist for measuring signal strength, and typically client software for operating a wireless network interface comprises a signal strength monitor. The desirability of the signal is related to signal strength. The mobile node determines signal strength for one or more available signals provided by respective foreign agents, and selects a signal among the one or more signals according to strength. Other criteria for selecting a signal can include, for example, signal strength over time, e.g., whether the signal is becoming stronger or weaker over time, and user preferences for particular foreign agents.

According to an embodiment of the present disclosure, the seamless vertical handoff occurs without user input. The user does not need to be aware that a handoff has happened. Further, upon detecting that the signal of the first foreign agent, or any other WLAN foreign agent, has reached a desirable strength, the mobile node can perform a handoff back to the WLAN signal.

Further, connectivity providers, e.g., WWAN service providers operating WWAN foreign agents, may not need to implement changes to accommodate the mobile node. The system and/or method of the mobile node may be independent of the WWAN service provider.

The ability to automatically and seamlessly switch between different foreign agents, regardless of their underlying connectivity technology and their operators, enables a mobile node to maintain connectivity at all times and at a lower cost. That is, cellular network usage is typically more expensive than that of WLAN connectivity. Seamless handoff makes it possible for users to use WLAN connectivity when it is determined to be desirable while enjoying continuous connectivity.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
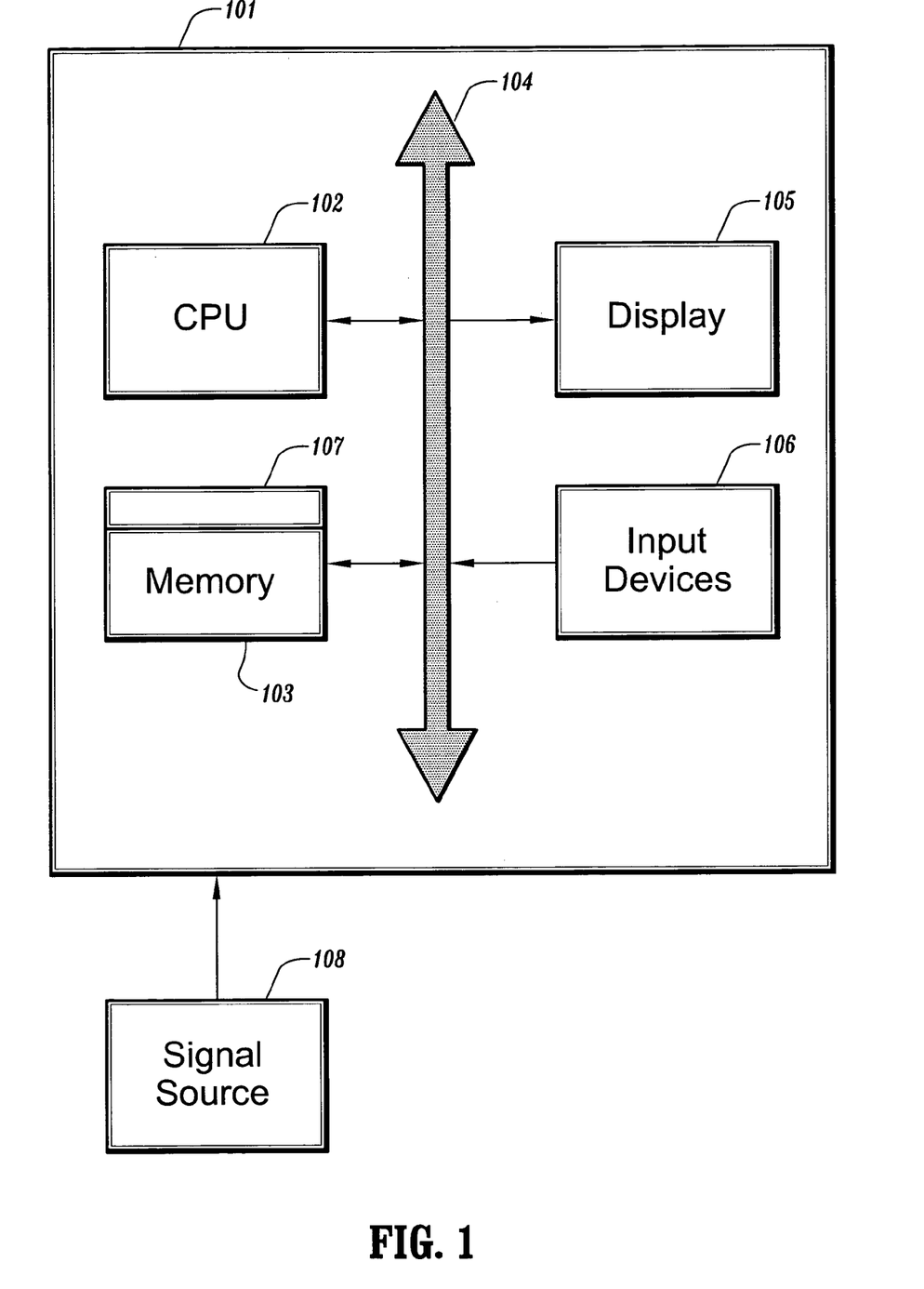
FIG. 1 is a diagram of a system according to an embodiment of the present disclosure.

Referring to FIG. 1, a mobile node 101, such as a laptop computer or handheld device, for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the mobile node 101 is a general-purpose computer system that becomes a specific purpose computer system when executing the routine 107 of the present invention.

The mobile node 101 also includes an operating system and micro instruction code. The various processes and functions described herein may either be part of the micro instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
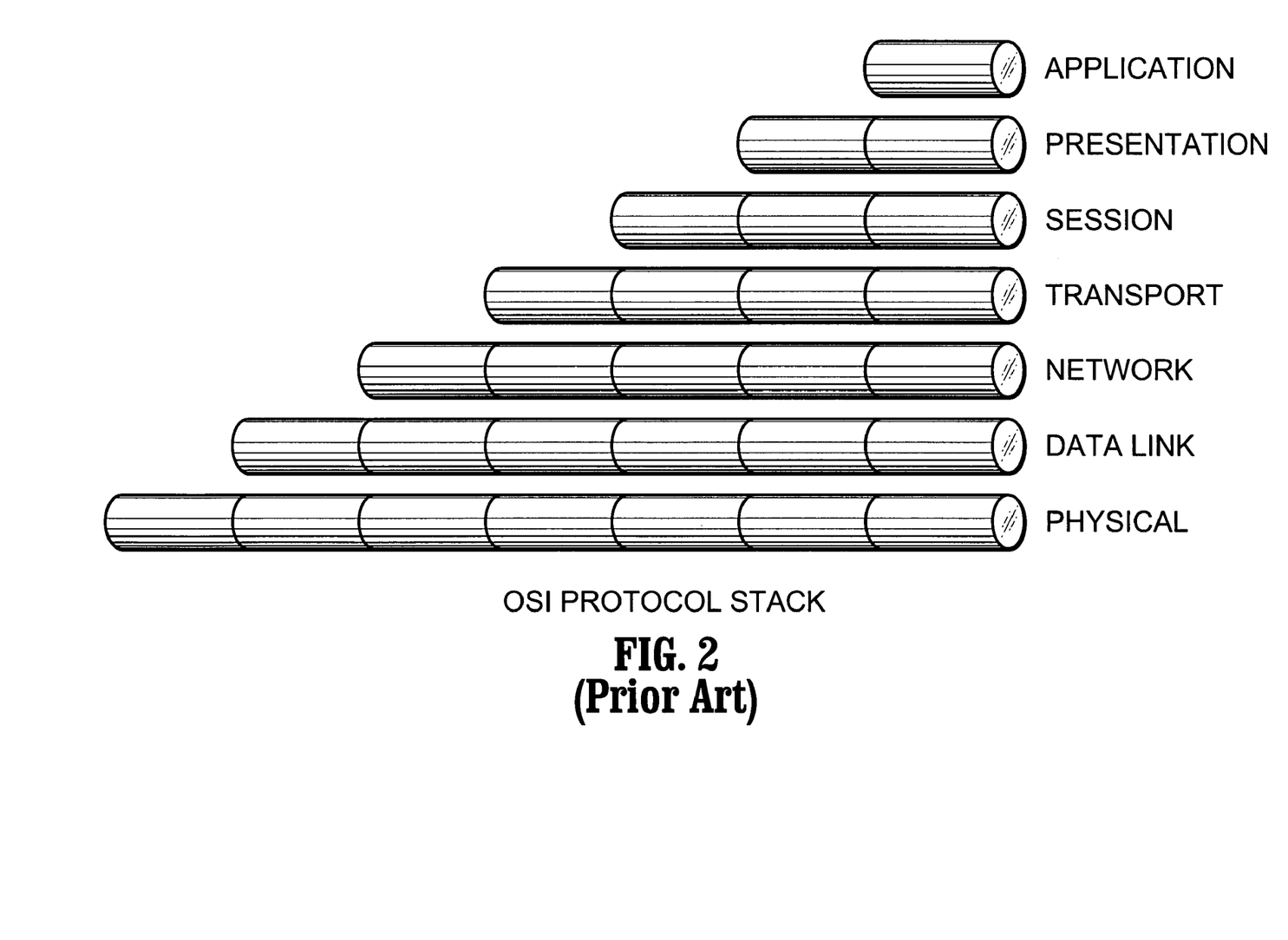
FIG. 2 is a diagram of an OSI stack.

According to an embodiment of the present disclosure, handoff can take place at different layers of the Open Standards Interconnect (OSI) protocol stack. An example of the OSI protocol stack is shown in FIG. 2. The functions of each layer of the OSI are well known in the art. When a mobile node switches from one WLAN cell to another WLAN cell, the network interface hardware performs the link-layer handoff, which changes the association of the mobile node from one access point to another. To maintain un-disrupted network service, the mobile node performs a network-layer handoff, which ensures that the device can continue to communicate with other Internet hosts even when the mobile node moves into a different subnet.

Figure 3A:
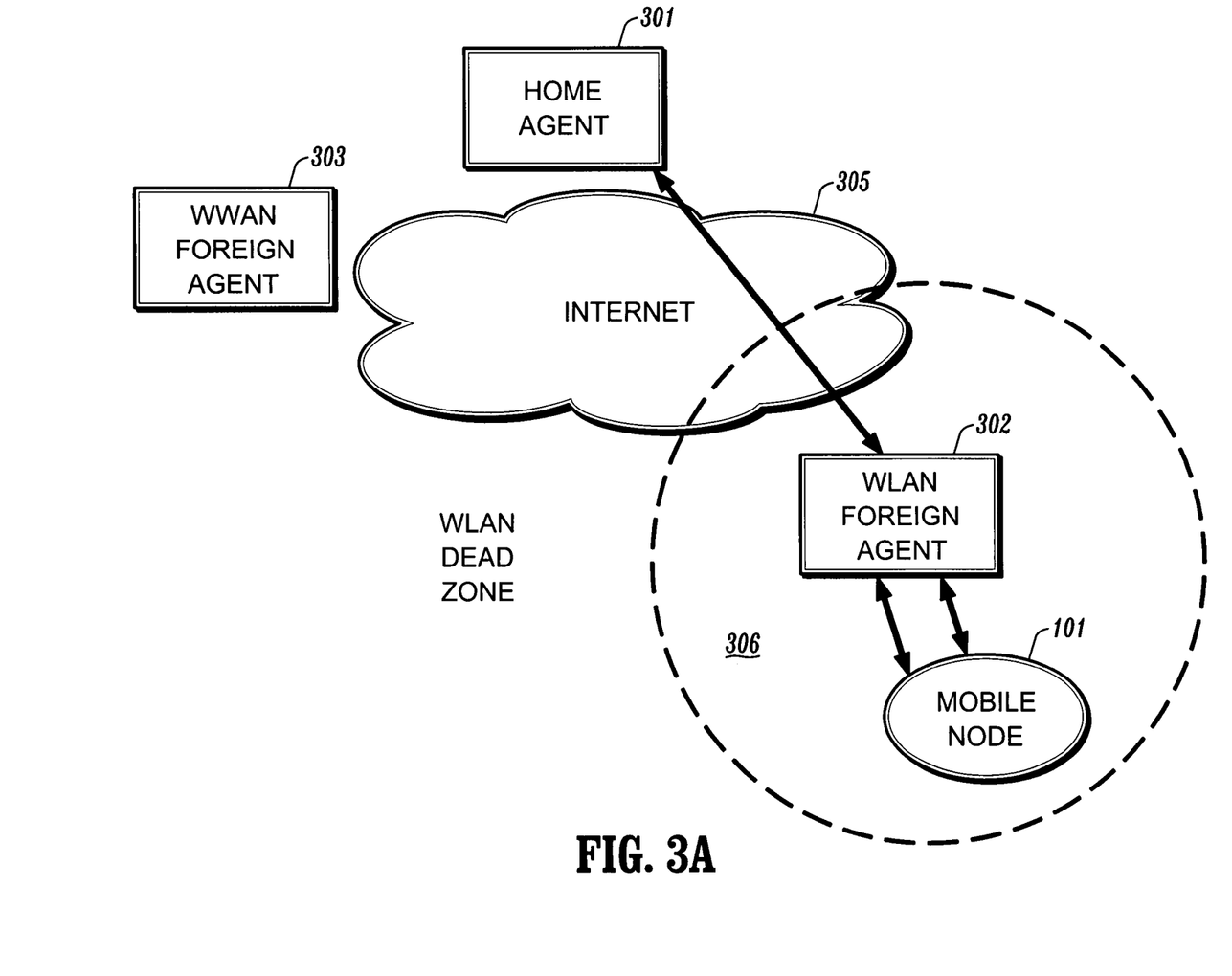
FIG. 3A is a diagram of a network according to an embodiment of the present disclosure.

According to an embodiment of the present disclosure, and referring to FIG. 3A, a home agent 301 and foreign agents 302-303 are connected on a wired network. The WLAN foreign agent 302 periodically broadcasts Mobile IP advertisements on the WLAN to which a mobile node 101 is attached.

For horizontal handoff in the network, whenever a mobile node migrates from a first subnet to a second subnet, it starts receiving the Mobile IP advertisements from the second subnet's corresponding WLAN foreign agent. The Mobile IP software running on the mobile node intercepts these advertisements and sends a registration request to a newly discovered WLAN foreign agent of the second subnet. After authentication and consultation with the home agent, an IP-over-IP tunnel is established between the home agent and the new WLAN foreign agent. Tunneling includes, for example, encapsulating one packet within another packet. Various methods for tunneling exist, including, for example, the Layer 2 Tunneling Protocol and the Point-to-Point Tunneling Protocol. More generally, tunneling is described in RFC 1853, wherein an outer IP header is added before the original IP header. Between the outer IP header and the original IP header any other headers for the path, such as security headers specific to the tunnel configuration may be added. The outer IP header includes source and destination information identifying the endpoints of the tunnel. The inner IP header includes source and destination information identifying the original sender and recipient of the datagram.

For a mobile node to move across IP subnets and maintain all the active network connections, an indirection mechanism is needed to channel packets between the mobile node and the parties it is communicating with. The packet indirection mechanism enables a mobile node to keep its IP address unchanged regardless of its geographic location. The packet indirection mechanism is notified whenever the mobile node moves into a different subnet, wherein it can adjust the redirection parameter accordingly.

Mobile IP is an example of a packet indirection mechanism. Mobile IP has been extended to implement vertical handoff. The extension includes a WLAN link status-monitoring module to the mobile node. In the Mobile IP framework, a foreign agent channels packets between a mobile node and its home agent, and a mobile node and its foreign agent typically reside on the same subnet. Unlike WLAN, it is unlikely that the GPRS link's foreign agent can reside on the same site as mobile node, because the GPRS service provider does not necessarily support Mobile IP. A tunnel may be established between a mobile node and its GPRS link's foreign agent to channel traffic between a mobile node and its communicating parties. Note that this is in addition to the IP-IP channel between a foreign agent and home agent in Mobile IP.

While one end of this tunnel always resides in the mobile node, there are at least three possible ways to implement the other end of the tunnel. First, it could be a special communication agent, which uses a proprietary protocol to talk to home agent and mobile node. Second, it could be a generic Mobile IP foreign agent that communicates with mobile node and home agent in a standard way, and sets up a forwarding tunnel between home agent and mobile node, authenticates the mobile node, and updates its own routing table to route packets appropriately. Support is added for tunneling with mobile node to the existing foreign agent implementation. Third, the home agent can directly tunnel packets to a mobile node without the help of any intermediate agent.

It is also possible to implement vertical handoff in a way that is independent of Mobile IP. For example, within network address translation (NAT) technology for packet interception and redirection an enterprise-wide NAT gateway may be used to intercept traffic going to mobile nodes belonging to the enterprise. A tunnel is set up between each mobile node and the NAT gateway so that the communications between a mobile node and its communicating parties always go through the NAT gateway. Whenever a mobile node changes its IP address, it informs the NAT gateway so that the old tunnel can be torn down and a new tunnel can be established. Since this tunnel can run over a WLAN, as well as a GPRS link, this architecture provides a unified framework for both vertical and horizontal handoff. A new IP address may be acquired through DHCP for example. Further, an authentication protocol is issued between mobile node and NAT gateway.

Figure 3B:
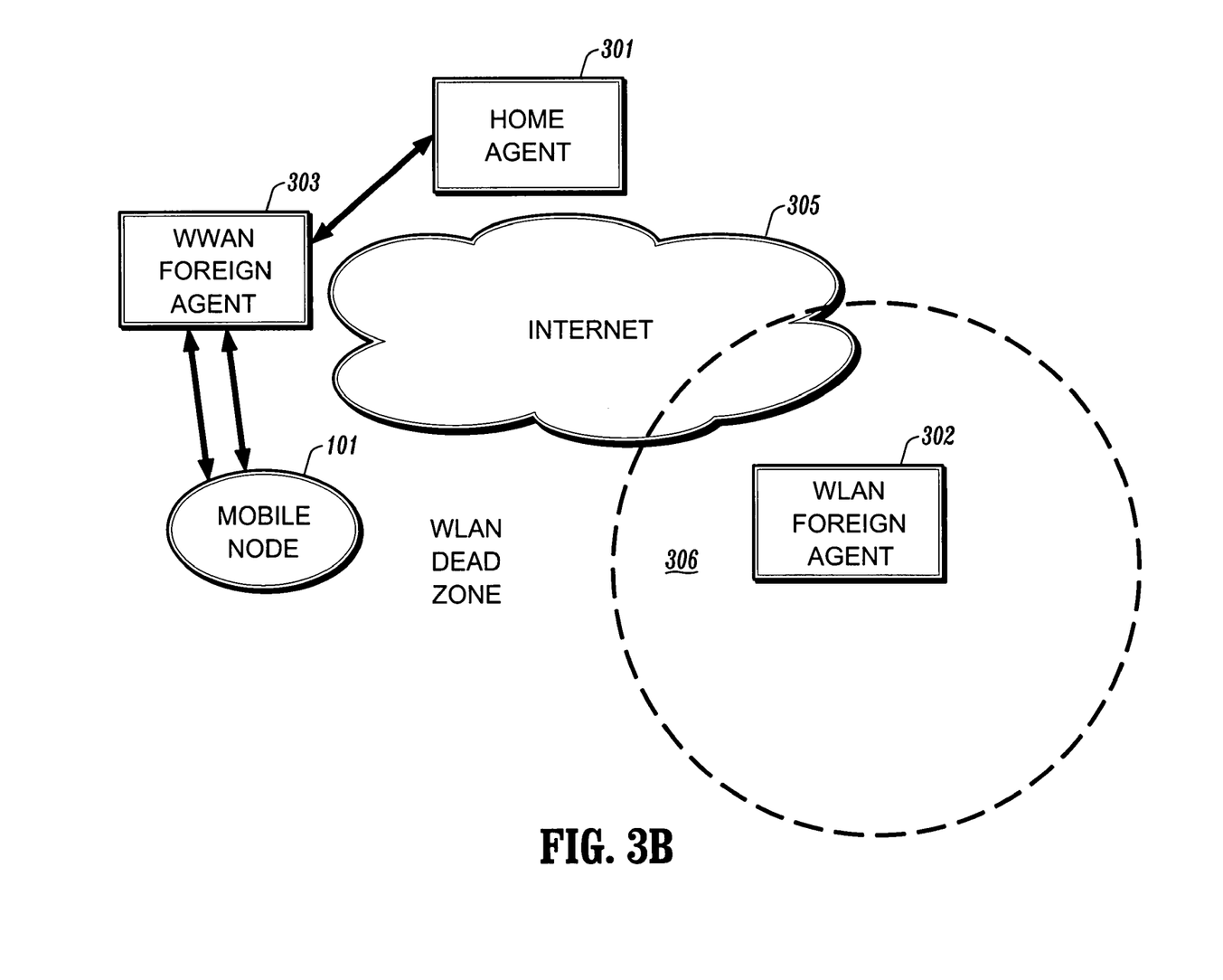
FIG. 3B is a diagram of a network according to an embodiment of the present disclosure.

For a Mobile IP implementation for vertical handoff the access point of a WWAN link is typically a layer-3 dial-up server, rather than a layer-2 bridge, as in the case of a WLAN access point. As shown in FIG. 3B, as the mobile node 101 exits the service area 306 of the WLAN foreign agent, it detects that the signal strength of the WLAN is decreasing. Upon determining that the signal strength is equal to or less than a first threshold strength, the mobile node initiates a handoff. If no WLAN foreign agents are present with a signal strength above a second threshold, e.g., a 10% above the first threshold, the mobile node initiates a vertical handoff. The mobile node 101 establishes a new connection with the WWAN foreign agent 303 (e.g., a GPRS foreign agent), and tunnels all its active network connections on this new connection while maintaining its IP address. Because the WWAN interface of the mobile node is typically behind a NAT gateway, the tunnel between the mobile node and the WWAN foreign agent is a TCP tunnel, rather than the IP-over-IP tunnel. The round-trip delay on a WWAN link, such as GPRS, may be long; the number of interaction messages between a mobile node and the WWAN foreign agent should be reduced to the minimum. WWAN foreign agent advertisements are cached and replayed to the mobile node so that interactions between the WWAN foreign agent and the mobile node conform to a Mobile IP specification. Thus, the vertical handoff latency is reduced to one round-trip delay on the WWAN link. To minimize packet loss during a vertical handoff interval, a mobile node may initiate a vertical handoff anticipatively so that it can buffer additional packets from the WLAN foreign agent while it switches to the WWAN foreign agent. In addition, the WWAN foreign agent also buffers packets from the home agent. The packets are paced at a controlled rate on the WWAN link so that packet drops are minimized. Through both buffering and traffic shaping, packet loss is reduced to substantially zero.

When a mobile node uses a GPRS link, it needs to obtain an IP address for its GPRS device. Because of lack of public IP addresses, the GPRS service provider typically uses an NAT gateway to translate between public IP addresses and addresses assigned to mobile nodes' GPRS devices. Thus, a mobile node initiates all network connections it has with the outside world through GPRS. A mobile node decapsulation mode and co-located care of address mechanism are not used when there is no foreign agent in the infrastructure. In mobile node decapsulation mode, an IP-over-IP tunnel is established directly between a mobile node and the home agent without an intermediate foreign agent. One end point of the tunnel is bound to the IP address of a mobile node, which is typically obtained through a standard protocol such as DHCP or some other static address assignment mechanism.

For inbound packets to reach a mobile node through an NAT gateway, they need to be part of a connection initiated by the mobile node. An IP-over-TCP tunneling mechanism may be used. The mobile node initiates the TCP tunnel so that the NAT gateway on the GPRS network can allow bidirectional traffic in this connection. Use of TCP for tunneling ensures that the tunneled data reaches the destination in a reliable manner.

A virtual network device, tcptun, is used that is exposed to Mobile IP software. This virtual device implements the TCP tunneling mechanism over an already established TCP connection with the GPRS foreign agent. It also emulates the activities of a network interface for all inbound packets received over the TCP connection, thus enabling connectivity over a LAN with the GPRS foreign agent. When a vertical handoff between the WLAN interface and the GPRS interface is needed, a horizontal handoff is triggered between the WLAN interface and the virtual device for GPRS interface.

The home agent 301 acts as a proxy for the mobile node 101, intercepting incoming packets intended for the mobile node 101 and transmitting the incoming packets to the WLAN foreign agent 302 over an IP-over-IP tunnel. The foreign agent decapsulates the packets coming from the tunnel and forwards the packets to the mobile node. Similarly, packets that a mobile node transmits are received by the WLAN foreign agent and are tunneled over to the home agent 301, which further routes them to the true destination on the Internet 305.

The home agent 301 is a node in the home subnet that provides a fixed IP address abstraction for mobile nodes. Each foreign agent 302-303 is an indirection point for routing. The tunnel is between the home agent and a foreign agent. A WLAN foreign agent is associated with a wireless access network, and periodically broadcasts advertisements to announce its presence to mobile nodes. Accordingly, the mobile nodes are mobility aware of the WLAN environment. When a mobile node is in a foreign subnet, the mobile node communicates with Internet hosts through triangle routing.

Triangle routing is a process of sending and receiving packets to the mobile node. Although a mobile node does not need to send packets via its home agent, tunneling out-going packets to the home agent is a preferred mode of routing because it avoids various issues such as ingress and egress filtering that the firewalls at the foreign and home sites perform. Whenever a mobile node migrates to a new foreign subnet, it binds with the foreign agent of the new foreign subnet, and tears down the association with the foreign agent in the old subnet. When a mobile node returns to its home subnet, standard routing is resumed. The process of switching from one foreign agent to another as a mobile node moves across adjacent wireless IP subnets is Mobile IP handoff.

The mobile node preserves its own IP address while roaming between horizontal and vertical agent. No modification may be needed for non-mobile nodes, e.g., other devices connected to the network, to communicate with the mobile node.

In Mobile IP, there could be multiple network interfaces in a mobile node, but only one of the active interfaces may be used for external communication. An interface is active if advertisements from some mobile agent are received on that interface. The mobile node assumes the task of triggering a Mobile IP handoff, where a mobile node switches from WLAN interface to the virtual interface or vice versa.

To make effective use of WLAN bandwidth and GPRS link bandwidth, the mobile node makes the handoff decisions intelligently. For this purpose, the mobile node implements a decision module that monitors, for example, the WLAN signal strength, quality, and noise level. Whenever the communication over WLAN starts degrading and the signal strength falls below a certain threshold, the mobile node triggers a handoff from WLAN interface to the virtual interface. The handoff triggering is carried out by sending multiple foreign agent advertisements on behalf of the GPRS foreign agent, through the virtual interface, up to the TCP/IP stack of the mobile node. This enables Mobile IP to carry out a network-layer handoff and start using the virtual interface. Once the WLAN signal strength becomes available again, Mobile IP switches back to the WLAN interface by holding off the foreign agent advertisements on the GPRS link.

It may so happen that the mobile device is in a region where the signal strength is close to the threshold value but fluctuates in a range. This would set off multiple handoffs back and forth. To address this issue, the decision module may use a two level thresholding scheme. Instead of choosing just one threshold, a high watermark threshold and a low watermark threshold may be selected. The decision module triggers a handoff from WLAN to GPRS if the signal falls below the low watermark threshold. A reverse handoff is triggered only when the signal value improves above the high watermark threshold. The distance between high and low watermarks should be more than an expected fluctuation range of radio signals. This ensures that a handoff from WLAN to GPRS is triggered only when the mobile node is moving away from the network, and similarly, the reverse handoff is triggered when the mobile node is moving towards the WLAN.

Traffic monitoring, filtering, and shaping over the GPRS link may be used to maintain a desired level of quality of service. Since traffic is tunneled through the TCP connection between the mobile node and the GPRS foreign agent, the traffic prioritization may be carried out at connection endpoints. A traffic shaping mechanism is implemented to improve the utilization of GPRS link and to provide quality of service guarantee to critical applications.

According to an embodiment of the present disclosure, a low-latency network-layer vertical handoff leverages Mobile IP, WWAN dial-up server, and PAP (Password Authentication Protocol) stack. The system comprises a WLAN link status monitor on the mobile node that determines when to switch from WLAN to WWAN and when to switch from WWAN to WLAN to minimize WAN connectivity charges. The system comprises an in-kernel IP traffic redirection mechanism that moves traffic descending from the local TCP-IP stack onto a TCP tunnel over the WWAN link or to an WLAN interface, depending on which interface is active currently. Further, intelligent packet buffering at the mobile nodes reduces the performance impact of long vertical handoff latency.

Figure 4A:
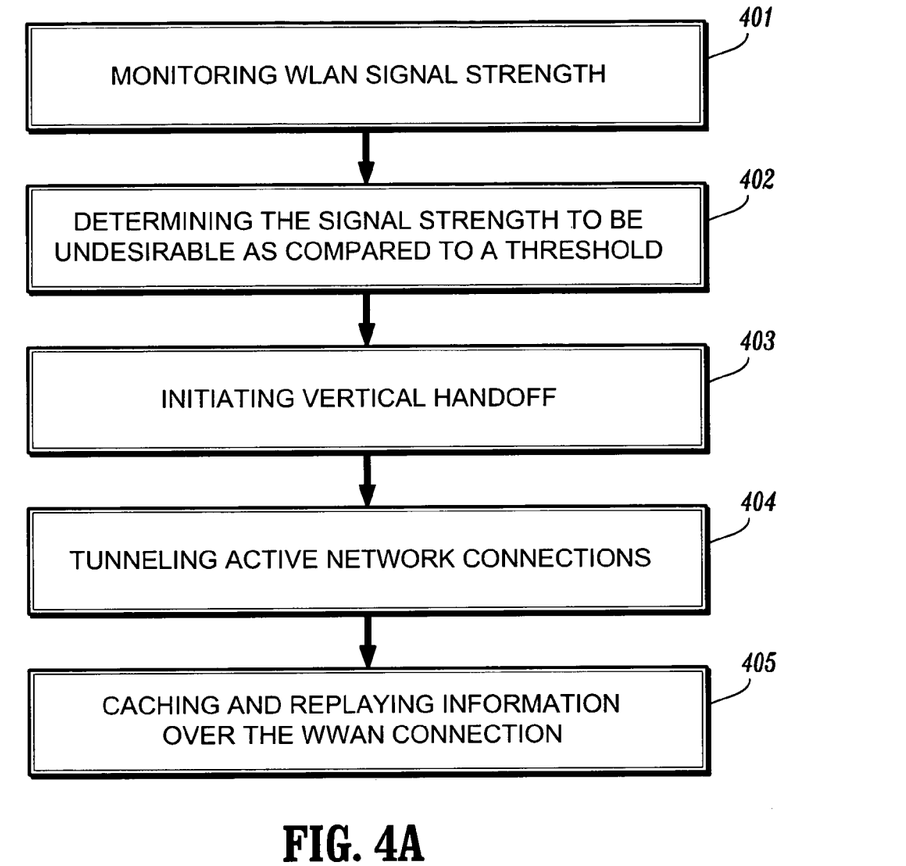
FIG. 4A is a flow chart of a method according to an embodiment of the present disclosure.
Figure 4B:
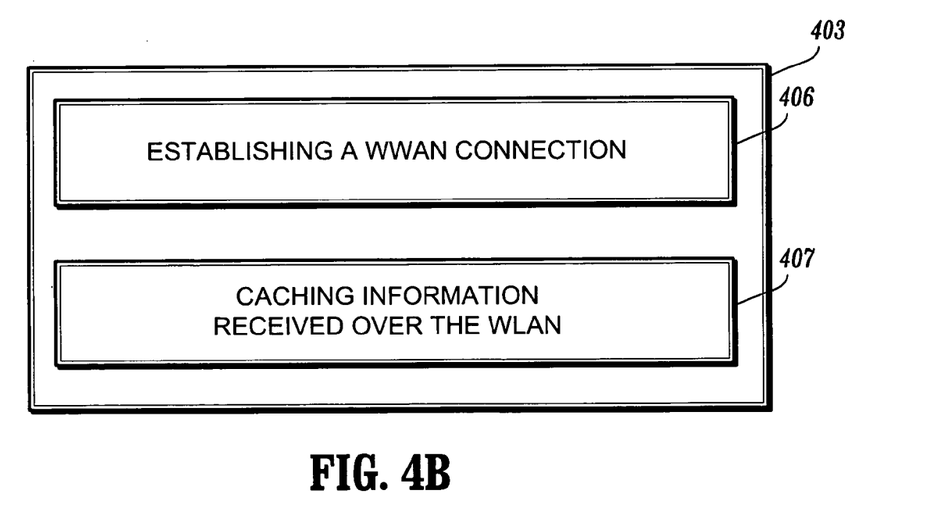
FIG. 4B is a flow chart of a method according to an embodiment of the present disclosure.

Referring to FIG. 4, a method for vertical handoff in a wireless network vertical comprises monitoring a WLAN signal 401. Upon determining that the WLAN signal has become degraded 402, as compared to a threshold, a horizontal handoff is initiated. Upon determining that no desirable horizontal connection is available, a vertical handoff is initiated 403. Active network connections are tunneled on the established connection while maintaining an IP address 404. Information to be sent over the WWAN connection is cached and replayed at a controlled rate 405. Referring to FIG. 4B, initiating the vertical handoff 403 comprises establishing a WWAN connection 406 and caching information received over the WLAN 407. The caching of information received over the WLAN is performed before the WLAN connection is torn down or dropped due to, for example, loss of signal strength.

Figure 5:
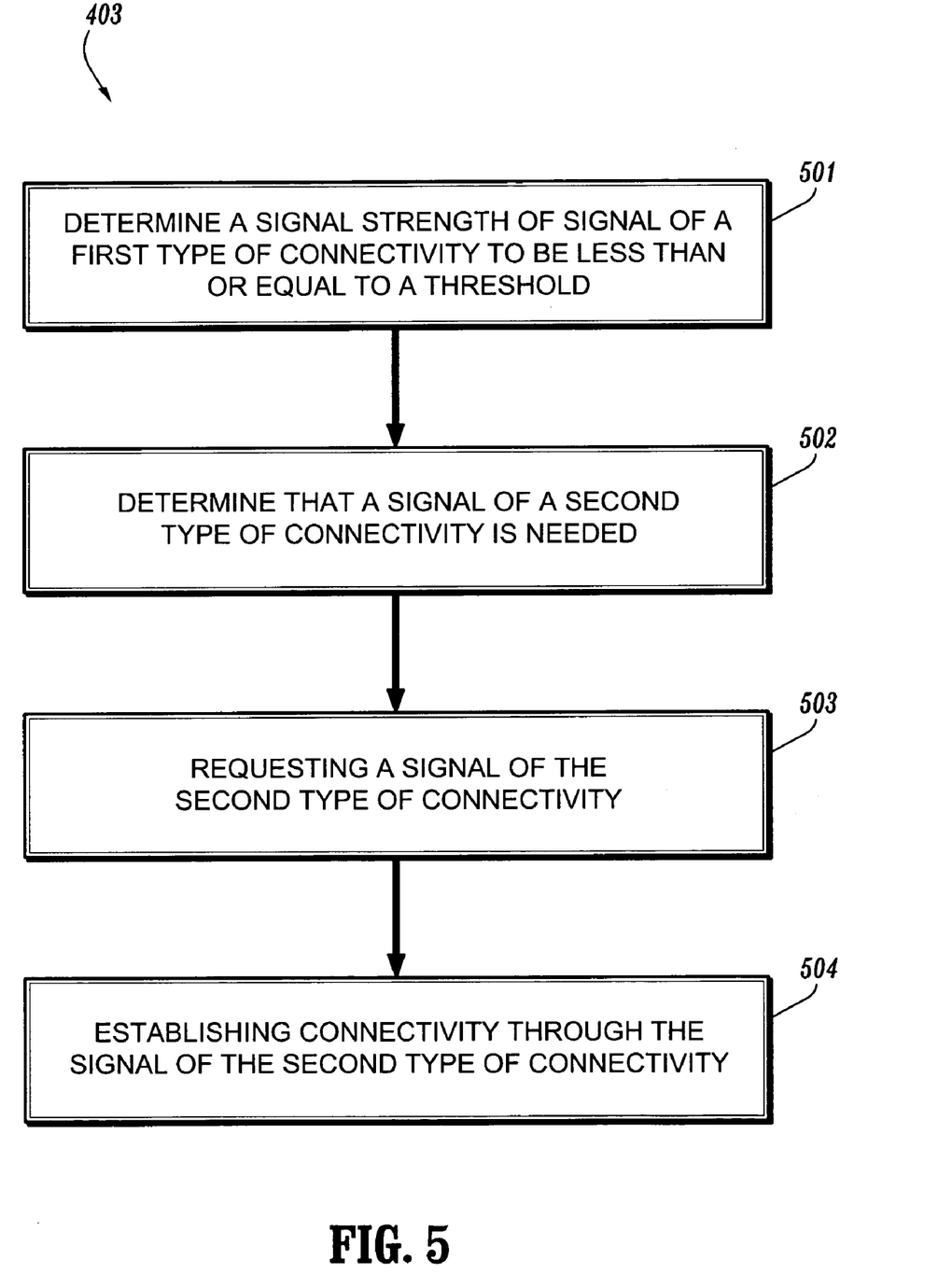
FIG. 5 is a flow chart of a method according to an embodiment of the present disclosure.

Referring to FIG. 5, the initiation of a handoff 403 comprises detecting that a WLAN signal currently being used has a strength lower than a desirable level, for example, as compared to a threshold level 501. Determining that switch connectivity to a WWAN foreign agent is needed 502. For example, the mobile node may determine that no other WLAN foreign agent is available for establishing a connection. The mobile node sends a packet to a WWAN foreign agent indicating that connectivity is needed 503. The packet sent to the WWAN foreign agent indicates an identification of the mobile node. The mobile node will continue to listen to the WLAN signal for any packets that have not yet arrived. The mobile node establishes a TCP connection to the WWAN foreign agent if packets are to be sent through the WWAN foreign agent 504.

It should be noted that different schemes may be implemented by the WWAN service providers operating the WWAN foreign agents. For example, a WWAN service provider may charge for packet traffic only and not charge for establishing a connection. In this example, the mobile node may freely establish connections to reduce handoff latency, and consider only the volume of packets to be trafficked across the network. In another example, the WWAN service provider may charge for establishing a connection and connectivity time after establishing the connection. In this example, the mobile node may consider the latency of the handoff time as part of the initiation of WWAN connectivity as a tradeoff between WWAN service provider charges and handoff latency. Various models may be used for determining a desirable tradeoff. These models may be formulated according to a user preference for, for example, low latency or low cost of operation.

Figure 6:
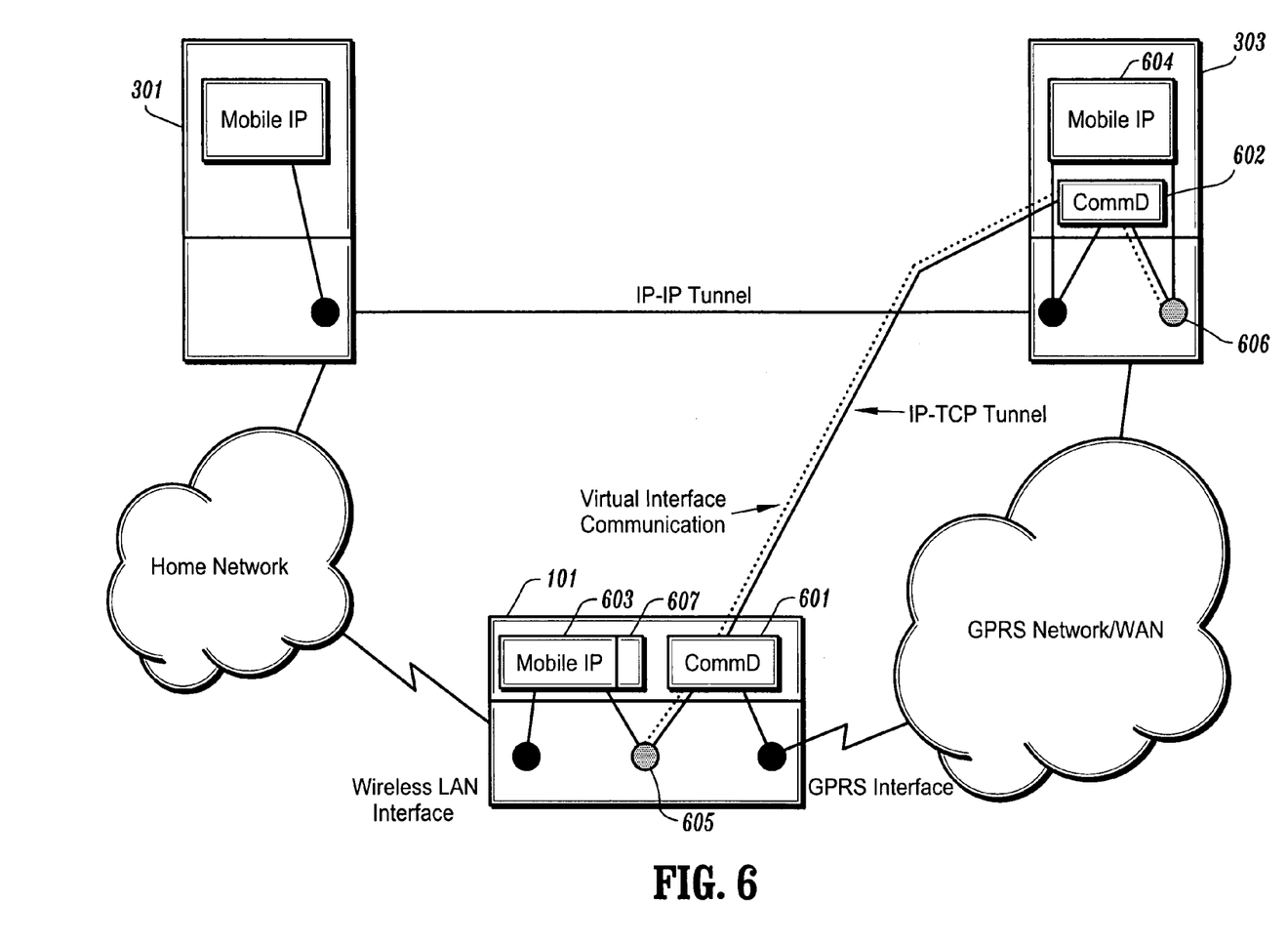
FIG. 6 is an illustration of a system architecture according to an embodiment of the present disclosure.

A prototype has been implemented under the Linux operating system. Referring to FIG. 6, the mobile node 101 and GPRS foreign agent 303 include communication daemons 601 and 602, respectively. The communication daemons 601-602 establish a TCP connection with each other over a GPRS network. A virtual interface of the mobile node 605 and a virtual interface of the GPRS foreign agent 606 are exposed to the Mobile IP software 603 and 604, respectively. Packets transferred through the virtual interfaces are tunneled over the TCP connection. The communication daemon 601 on mobile node interacts with the decision module for triggering vertical handoff. The communication daemons 601 and 602 also implement the traffic monitoring and filtering logic for effectively using the GPRS link bandwidth.

The Mobile IP software 603 of the mobile node 101 includes a link status monitor 607 for monitoring a signal strength of the wireless local area network signal, and a vertical handoff initiation module for initiation the vertical handoff upon determining the signal strength to be undesirable.

The mobile node supports WLAN link availability monitoring, TCP tunneling, traffic shaping and multiple network devices, and foreign agent needs to be modified to support TCP tunneling and traffic shaping. Mobile IP software may be used to support an early-expiration policy for mobile agent advertisements to facilitate the handoff process. The primary entities responsible for communication between the mobile node and the GPRS foreign agent are the communication daemons (CommD) running on both nodes. The communication daemons on the mobile nodes act as clients to the communication daemon on the GPRS foreign agent. The communication daemons are responsible for establishing and maintaining the TCP tunnel between a mobile node and the GPRS foreign agent. The communication daemons are also responsible for providing network Quality of Service to different applications running on mobile nodes. The communication daemon on a mobile node is responsible for interacting with other local components like, the virtual device and the decision module. It is also responsible for triggering the Mobile IP handoff.

To simulate vertical handoff with horizontal handoff, a virtual network device, called tcptun, may be implemented. This virtual device is exposed to the Mobile IP software and the communication daemon. The generic Virtual Network Device support in Linux kernel may be used to implement TCP tunneling. Similar support is also available in Windows operating system through the NDIS miniport abstraction. The tcptun device exposes an API to be used by the communication daemons to read and write network packets. The packets that are supposedly transmitted over tcptun are handed over to the communication daemon to be tunneled over the TCP connection. The packets received over the TCP tunnel are given to tcptun, which in turn, are given to the operating system TCP/IP stack in a decapsulated form. Thus, from TCP/IP stack point of view, the virtual device is just another network interface. During the system initialization, the tcptun device configuration, such as IP address, subnet mask, etc., is assigned the same value as that of the WLAN network interface card (NIC). From this point onwards, the Mobile IP software starts listening on this device for mobile agent advertisements. On reception of GPRS foreign agent advertisements on tcptun, Mobile IP software registers with the foreign agent using the same device. Once the registration is successful, the routing table entries are updated to set the tcptun device as the default interface for all outbound packets bearing the mobile node home IP address as the source address. These outbound packets are read by the communication daemon and are tunneled over the TCP connection to the GPRS foreign agent, which takes care of further routing.

During the handoff between WLAN and GPRS, there is a possibility of packet loss because of unavailability of the wireless interface and the delay in registration. Packet loss for upstream traffic is reduced or eliminated by buffering the packets and retransmitting them after handoff completion. To buffer the packets that are transmitted using the WLAN NIC, a NetFilter mechanism is used, which is available in Linux kernel. Using NetFilters, packets that are going to be transmitted over the wireless NIC may be captured. These packets are buffered in tcptun internal buffers. After a handoff from WLAN to GPRS is complete, tcptun transparently hands over buffered packets to the communication daemon to tunnel to the GPRS foreign agent. When a handoff from GPRS to WLAN takes place, the tcptun device retransmits the buffered packets that were sent using the tunnel during the handoff. The retransmission is carried out over the wireless NIC. This approach completely eliminates the data loss of upstream traffic. The amount of buffering can be configured by the communication daemon.

The TCP connection may be setup by the mobile node as only the hosts residing behind NAT can initiate outgoing connections and no incoming connections are allowed. The mobile node communication daemon is responsible for initiating the dial out procedure on GPRS links and establishing the TCP connection. During system initialization, the mobile node communication daemon initializes the tcptun virtual device and connects to the GPRS network using GPRS interface. It also updates the routing table entries to set the GPRS interface as the default device for communication with the GPRS foreign agent. Once the TCP connection with the GPRS foreign agent is established, it receives all packets that are broadcast by the GPRS foreign agent. These packets include the Mobile IP agent advertisements. The mobile node communication daemon caches these advertisements without forwarding them to the tcptun virtual device. It also interacts with the decision module regarding the signal strength and quality of WLAN link. Based on inputs from the decision module, it initiates a vertical handoff by triggering a horizontal handoff. The horizontal handoff is triggered by releasing the cached foreign agent advertisements to the tcptun virtual device. On reception of these advertisements, Mobile IP software immediately initiates a handoff. From this point onwards, the mobile node uses the tcptun virtual device for all its external communications. In effect, it uses the GPRS link through the foreign agent communication daemon. When WLAN link later becomes available again, the decision module informs the communication daemon of this change. This results in mobile node communication daemon filtering out the GPRS foreign agent advertisements, and eventually a handoff from GPRS to WLAN. Subsequently Mobile IP software uses the WLAN NIC again after due registration with the mobile agent on the WLAN. The mobile node communication daemon also implements a traffic prioritization mechanism to effectively use the upstream bandwidth of the GPRS link.

The foreign agent communication daemon acts as a server for mobile node communication daemons running on mobile nodes. It acts as a router and a mobile IP foreign agent for all GPRS-capable mobile nodes in an enterprise. After startup, like mobile node communication daemon, it initializes the tcptun virtual device, and listens on a well-known port for incoming TCP connections from mobile node communication daemons. Once a TCP connection is established, the interaction with the virtual device is similar to that of mobile node communication daemon. The foreign agent communication daemons demultiplex packets that are transmitted using the tcptun virtual device over multiple TCP connections. For this purpose it maintains a mapping between the home address of the mobile node and the connections. Every outgoing packet is examined to determine the destination address, based on which, the appropriate TCP connection is used to tunnel the packet. All relevant broadcasts, such as, mobile agent advertisements are transmitted over all connections. Foreign agent communication daemon also implements a traffic prioritization mechanism to use the downstream bandwidth effectively.

Since the GPRS foreign agent is expected to support multiple mobile nodes belonging to an enterprise, its scalability is an important design consideration. Assuming that the GPRS foreign agent is connected to the enterprise network, the downstream traffic to mobile nodes is received by the GPRS foreign agent from the enterprise network, typically home agent, and the upstream traffic from the mobile nodes is received from the WAN. The upstream traffic from each mobile node is of the order of around 10 Kbps. Compared with current wired network capacities, this is relatively modest. Thus, the network scalability of GPRS foreign agent is solely determined by the amount of downstream traffic it needs to service.

The decision module on mobile node is responsible for triggering Mobile IP handoffs. The handoff decisions are based on the monitored signal strength, quality, and noise levels for the wireless network interface. The Wi-Fi network cards expose these values to the device driver. The signal quality for WLANs is determined by computing the difference between the background noise and the signal strength. The decision module periodically polls the device driver statistics to observe a change in these values. The decision module computes an average of these values using a fixed number of previous samples. The averaging scheme is used to eliminate the effects of sudden surges or drops in the observed signal strength values. When the observed average signal level falls below a predetermined low watermark threshold, the decision module notifies the mobile node communication daemon to initiate a vertical handoff. The mobile node communication daemon responds to this notification by sending multiple cached GPRS foreign agent advertisement over the tcptun virtual device. Mobile IP responds to these advertisements by sending registration requests to the GPRS foreign agent and upon success, starts using the virtual device. A reverse process is carried out when the signal strength improves beyond a predetermined high watermark threshold. The decision module employs this two-level thresholding scheme to avoid oscillating handoffs between WLAN and GPRS interfaces.

Communication daemons implement a traffic prioritization mechanism loosely based on DiffServ expedited forwarding specifications. Because a mobile node can have multiple TCP/UDP connections going on simultaneously, this traffic prioritization mechanism is designed to regulate these TCP/UDP connections, which share the same TCP tunnel. There are multiple priority queues associated with each TCP tunnel. Each packet sent over a TCP tunnel is examined for its type. If a packet is Mobile IP control message, such as, registration, deregistration, advertisement, etc., the packet is placed in the highest priority queue. Next, the mobile users are allowed to configure the relative priorities among different classes of traffic depending on the quintuple specification as used in Wireless Rether protocol, e.g.,{SrcAddr, SrcPort, DestAddr, DestPort, Protocol}.

For each packet, a lookup is performed in the specified user policies and an appropriate priority queue is selected. The packets are transmitted over the TCP connection in a paced manner to match the GPRS bandwidth. The packets from higher priority queue are dispatched before the packets from lower priority queues. When the packets arrive in a queue faster than the dispatching rate the packets are dropped in a tail drop fashion. This priority mechanism ensures that the meager GPRS bandwidth is efficiently used by applications that are of greater interest to the mobile node users.

Figure 7:
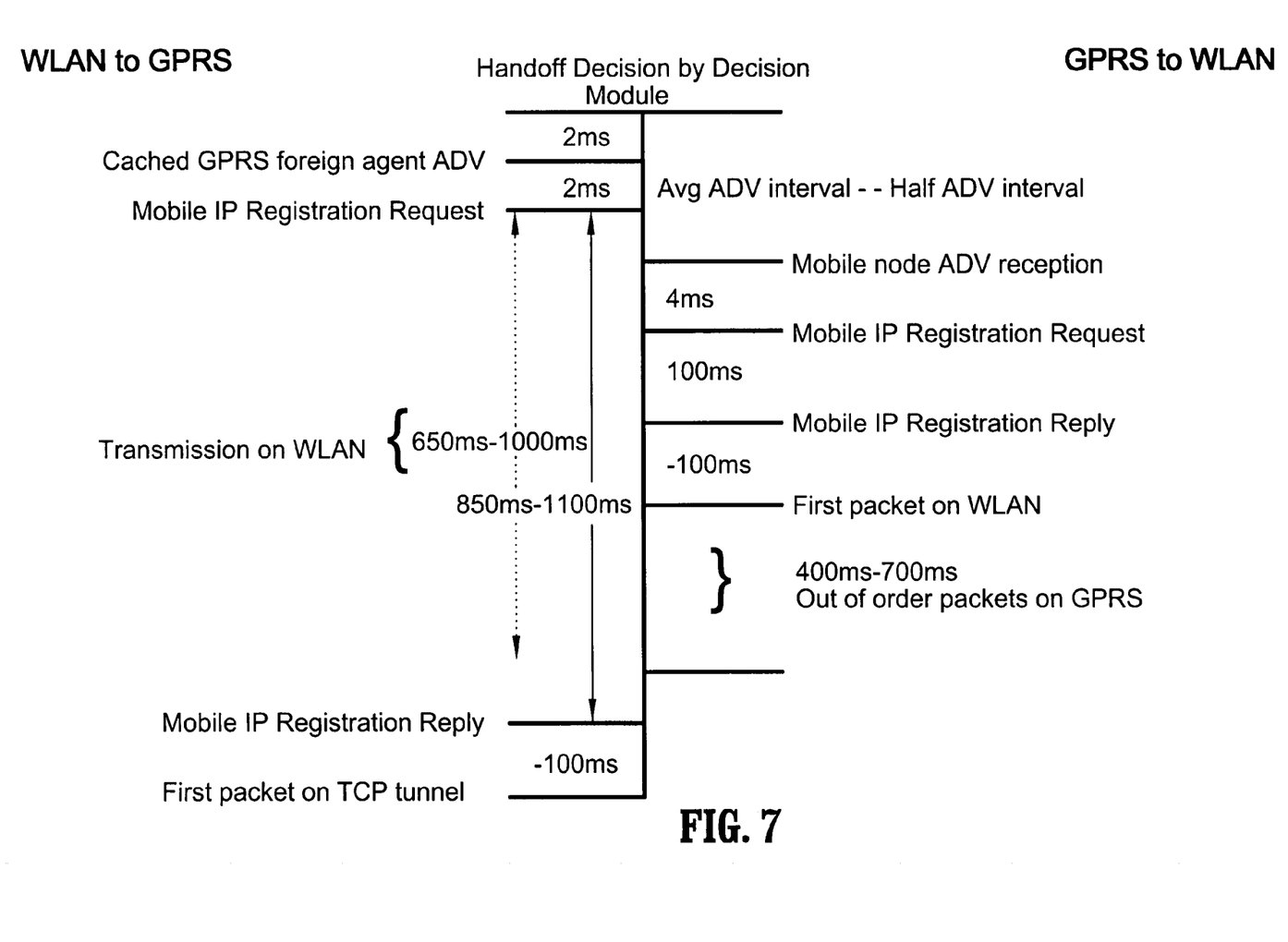
FIG. 7 is a Gant chart according to an embodiment of the present disclosure.

FIG. 7 shows a Gant chart for Mobile IP handoff for both WLAN to GPRS and GPRS to WLAN scenarios according to the prototype implementation. The starting point in the chart corresponds to the instance when the decision module notifies the communication daemon to trigger the handoff. In WLAN to GPRS handoff, the cached GPRS foreign agent (FA) advertisement is released by communication daemon. Mobile IP responds to this advertisement by invalidating the previous agent advertisement and sending a registration. The GPRS foreign agent responds with registration reply. The length of the duration corresponds to the large round trip times on GPRS link. It should be noted however, that the time periods shown in FIG. 7 may increase or decrease with changes in the underlying technology and are for example purposes only.

Having described embodiments for a system and method for vertical handoff in a wireless network, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A vertical handoff system comprising:
   a first foreign agent providing connectivity to a network, the first foreign agent broadcasting a wireless local area network signal;
   a second foreign agent providing connectivity to the network via a wireless wide area network signal;
   a mobile node comprising executable code for performing a vertical handoff between the first foreign agent and the second foreign agent; and
   a home agent routing information to the mobile node through one of the first foreign agent and the second foreign agent according to an established connection of the mobile node.

2. The vertical handoff system of claim 1, wherein the mobile node further comprises a signal strength monitor.

3. The vertical handoff system of claim 1, wherein the mobile node comprises a buffer for caching information received through the first foreign agent prior to establishing a connection with the second foreign agent.

4. The vertical handoff system of claim 1, wherein the second foreign agent comprises a buffer for caching information to be transmitted to the mobile node.

5. The vertical handoff system of claim 1, wherein the home agent comprises a router for routing information transmitted from the mobile node.

6. The vertical handoff system of claim 1, wherein the executable code for performing the vertical handoff comprises:
   a link status monitor for monitoring a signal strength of the wireless local area network signal; and
   a communication daemon for initiating the vertical handoff upon determining the signal strength to be undesirable and for establishing connectivity between a mobile internet protocol module of the mobile node and the second foreign agent.

7. The vertical handoff system of claim 1, wherein the wireless local area network connects wirelessly to the mobile node via radio frequency electromagnetic airwaves.

8. The vertical handoff system of claim 1, wherein the wireless wide area network connects wirelessly to the mobile node via one of Code Division Multiple Access, Global System for Mobile Communications, General Packet Radio Service, Enhanced Data rate for Global Evolution or Wideband Code Division Multiple Access.

9. A vertical handoff method comprising:
   establishing a network connection to a network host via a wireless local area network;
   determining a strength of the wireless local area network connection to be at or below a threshold strength; and
   moving, seamlessly, the network connection to a wireless wide area network.

10. The method of claim 9, wherein the transition is transparent to a user and a remote end of the network connection.

11. The method of claim 9, wherein moving comprises buffering packets at a home agent and pacing packets sent to a mobile node, wherein the network connection exists between the home agent and the mobile node.

12. A method for vertical handoff in a wireless network vertical comprising:
   monitoring a wireless local area network signal carrying an active network connection;
   initiating vertical handoff to a wireless wide area network signal upon determining that the wireless local area network signal is undesirable;

tunneling the active network connection over the wireless wide area network signal; and caching and replaying information over the wireless wide area network signal.

13. The method of claim 12, wherein initiating the vertical handoff comprises establishing a wireless wide area network connection to a mobile node.

14. The method of claim 12, wherein initiating the vertical handoff comprises caching information received by a mobile node over the wireless local area network signal.

15. The method of claim 14, wherein the caching of information received over the wireless local area network is performed before a wireless wide area network connection is established.

16. The method of claim 13, further comprising determining whether a second wireless local area network signal is desirable prior to initiating the vertical handoff.

17. The method of claim 16, further comprising initiating a horizontal handoff upon determining that the second wireless local area network signal is desirable.

18. The method of claim 13, further comprising initiating vertical handoff from the wireless wide area network signal to the wireless local area network signal upon determining that the wireless local area network signal is desirable.

19. The method of claim 13, wherein desirability corresponds to a threshold for measuring strength of a wireless signal.

20. The method of claim 13, wherein tunneling comprises redirecting a signal of a client side mobile internet protocol implementation from the wireless local area network signal to the wireless wide area network signal.

21. The method of claim 13, wherein tunneling comprises providing a communication agent using a protocol to talk to home agent and mobile node.

22. The method of claim 13, wherein tunneling comprises:
providing a foreign agent for communicating with a mobile node and a home agent;
establishing a forwarding tunnel between the home agent and the mobile node;
authenticating the mobile node; and
updating a routing table of the foreign agent to route packets.

23. The method of claim 13, wherein tunneling comprises tunneling packets from a home agent directly to a mobile node.

24. The method of claim 13, wherein tunneling comprises:
intercepting traffic going to a mobile node belonging to an enterprise; and
establishing a tunnel between the mobile node and a network address translation gateway, wherein communications between a mobile node and a communicating party is via the network address translation gateway.

25. A program storage device readable by machine, tangibly embodying a program of instructions executable by the machine to perform method steps for vertical handoff in a wireless network, the method steps comprising:
monitoring a wireless local area network signal carrying an active network connection;
initiating vertical handoff to a wireless wide area network signal upon determining that the wireless local area network signal is undesirable;
tunneling the active network connection over the wireless wide area network signal; and
caching and replaying information over the wireless wide area network signal.

* * * * *